(12) United States Patent
Lin et al.

(10) Patent No.: US 12,522,765 B2
(45) Date of Patent: Jan. 13, 2026

(54) FLUORESCENT METAL-ORGANIC FRAMEWORK SUPERSTRUCTURE COMPOUND, PREPARATION METHOD AND APPLICATION THEREOF

(71) Applicant: GUANGDONG UNIVERSITY OF TECHNOLOGY, Guangdong (CN)

(72) Inventors: Pengcheng Lin, Guangdong (CN); Hongjiao Wu, Guangdong (CN); Weitai Yu, Guangdong (CN); Yingying Luo, Guangdong (CN); Yang Wang, Guangdong (CN); Ying Chen, Guangdong (CN)

(73) Assignee: GUANGDONG UNIVERSITY OF TECHNOLOGY, Guangdong (CN)

( * ) Notice: Subject to any disclaimer, the term of this patent is extended or adjusted under 35 U.S.C. 154(b) by 868 days.

(21) Appl. No.: 17/790,492

(22) PCT Filed: May 11, 2021

(86) PCT No.: PCT/CN2021/093034
§ 371 (c)(1),
(2) Date: Jun. 30, 2022

(87) PCT Pub. No.: WO2022/205569
PCT Pub. Date: Oct. 6, 2022

(65) Prior Publication Data
US 2023/0287261 A1    Sep. 14, 2023

(30) Foreign Application Priority Data
Mar. 31, 2021 (CN) .......................... 202110346336.3

(51) Int. Cl.
*C09K 11/06* (2006.01)
*B01F 33/30* (2022.01)
*C08G 83/00* (2006.01)

(52) U.S. Cl.
CPC .............. *C09K 11/06* (2013.01); *B01F 33/30* (2022.01); *C08G 83/008* (2013.01); *C09K 2211/182* (2013.01)

(58) Field of Classification Search
None
See application file for complete search history.

(56) References Cited

U.S. PATENT DOCUMENTS

2009/0121189 A1* 5/2009 Ju ...................... C09K 11/7773
252/301.4 R

FOREIGN PATENT DOCUMENTS

| CN | 101342472 A | 1/2009 |
|---|---|---|
| CN | 102757453 A | 10/2012 |

(Continued)

*Primary Examiner* — Tae H Yoon
(74) *Attorney, Agent, or Firm* — Cooper Legal Group, LLC

(57) ABSTRACT

The disclosure relates to the technical field of functional nanomaterials, in particular to a fluorescent metal-organic framework superstructure compound, a preparation method and application thereof. The present disclosure provides a method for preparing a fluorescent metal-organic framework superstructure compound, comprising the steps of: providing a microfluidic mixing device; injecting a soluble rare earth salt solution from the first feeding pipe 1; injecting an oil phase solution from the second feeding pipe 2; forming droplets of the rare earth salt solution in the mixing channel 4; then subjecting the droplets to a coordination reaction with an organic ligand solution to obtain the fluorescent metal-organic framework superstructure compound. The preparation method provided by the present disclosure can prepare the fluorescent metal-organic framework superstructure compound in the form of a sphere which is self-assembled from MOFs nanorods, and the particle size distribution of the sphere is uniform.

20 Claims, 6 Drawing Sheets

(56) References Cited

FOREIGN PATENT DOCUMENTS

| CN | 102827601 A | * | 12/2012 |
|---|---|---|---|
| CN | 104492381 A | * | 4/2015 |
| CN | 107602874 A | | 1/2018 |
| CN | 112457499 A | | 3/2021 |
| KR | 101034988 A1 | * | 5/2011 |
| WO | WO 2020210868 A1 | | 10/2020 |

* cited by examiner

FLUORESCENT METAL-ORGANIC FRAMEWORK SUPERSTRUCTURE COMPOUND, PREPARATION METHOD AND APPLICATION THEREOF

CROSS REFERENCE TO RELATED APPLICATION

This patent application claims the benefit and priority of Chinese Patent Application No. 202110346336.3 filed on Mar. 31, 2021, the disclosure of which is incorporated by reference herein in its entirety as part of the present application.

TECHNICAL FIELD

The disclosure relates to the technical field of functional nanomaterials, in particular to a fluorescent metal-organic framework superstructure compound, a preparation method and application thereof.

BACKGROUND ART

Metal-organic frameworks (MOFs) are porous crystalline materials composed of metal clusters or ions as connecting nodes and rigid organic ligands through coordination bonds. Compared with traditional porous materials such as zeolite, activated carbon, and silica gel, MOFs are favored by people due to their simple synthesis method, large specific surface area, and diverse and tunable structures. The rich designability of the structure and function of MOFs makes it possible to endow them with diverse functions by choosing different metal ions, clusters, and organic ligands, so there are a large number of reports on MOFs-based fluorescence sensing, biodetection and other cutting-edge applications.

Fluorescent MOFs superstructure is a three-dimensional spherical structure formed by the self-assembly of MOFs, which is a very promising multifunctional material. In addition to the unique structure, it can also play a role in compositing with other functional materials. Because of its very sensitive luminescence properties, composite fluorescent sensing MOFs with high sensitivity and selectivity can be obtained by rationally controlling the structure, pore size, and functional sites in the superstructure of fluorescent MOFs.

At present, the preparation method of fluorescent MOFs is mainly hydrothermal reaction. However, when using hydrothermal reaction, it is difficult to control its self-assembly to form superstructures, and usually only single MOFs nanorods or nanorod clusters can be obtained.

SUMMARY

In view of this, an object of the present disclosure is to provide a fluorescent metal-organic framework superstructure compound, a preparation method and application thereof. The preparation method provided by the present disclosure can prepare a spherical fluorescent metal-organic framework superstructure compound through self-assembly, and the particle size distribution of the spheres is uniform.

In order to achieve the above object, the present disclosure provides the following technical schemes:

The present disclosure provides a method for preparing a fluorescent metal-organic framework superstructure compound, comprising the steps of:

Providing a microfluidic mixing device comprising a first feeding pipe 1, a capillary 3 having a feeding end in communication with a discharge end of the first feeding pipe 1, a mixing channel 4 having a feeding end in communication with a discharge end of the capillary 3, further comprising a second feeding pipe 2 having a discharge end in communication with a feeding end of the mixing channel 4;

Injecting a soluble rare earth salt solution from the first feeding pipe 1, flowing through the capillary 3 into the mixing channel 4, injecting an oil phase solution from the second feeding pipe 2 into the mixing channel 4, and forming droplets of the rare earth salt solution in the mixing channel 4;

Subjecting the droplets of the rare earth salt solution flowing out of the mixing channel 4 to a coordination reaction with an organic ligand solution to obtain the fluorescent metal-organic framework superstructure compound.

In some embodiments, the soluble rare earth salt solution into the mixing channel 4 has a flow rate of 5-15 µL/min;

The oil phase solution into the mixing channel 4 has a flow rate of 150-250 µL/min.

In some embodiments, the capillary 3 is a cone, a bottom surface of the cone has an inner diameter of 0.05-0.15 mm, and an outer diameter of 0.3-0.4 mm;

The first feeding pipe 1 and the mixing channel 4 have an inner diameter independently of 0.5-0.6 mm, and an outer diameter independently of 0.75-0.86 mm;

The second feeding pipe 2 has an inner diameter of 0.35-0.45 mm, and an outer diameter of 0.47-0.57 mm.

In some embodiments, the soluble rare earth salt solution has a molar concentration of 300-400 mmol/L;

The soluble rare earth salt solution includes any one or two of a soluble europium salt solution, a soluble terbium salt solution and a soluble dysprosium salt solution.

In some embodiments, the oil phase solution includes an oil phase and a polar organic solvent, and the oil phase solution has a mass percentage of 0.05-0.15%.

In some embodiments, the oil phase is a surfactant, and the surfactant comprises Span 80 and/or Span 60.

In some embodiments, the organic ligand solution includes an organic ligand and a polar organic solvent, and the organic ligand solution has a molar concentration of 80-90 mmol/L.

In some embodiments, a ratio of amount of substance of the soluble rare earth salt to the organic ligand is (30-40): (8-9).

In some embodiments, the organic ligand is trimesic acid.

The present disclosure provides a fluorescent metal-organic framework superstructure compound prepared by the method described in above technical schemes, the fluorescent metal-organic framework superstructure compound is a sphere, and the sphere has a diameter of 150-260 m.

The present disclosure provides a fluorescent metal-organic framework composited with functional nanomaterials, comprising a fluorescent metal-organic framework superstructure compound and a functional nanomaterial supported on a surface of the fluorescent metal-organic framework superstructure compound;

The fluorescent metal-organic framework superstructure compound is the fluorescent metal-organic framework superstructure compound described in above technical schemes;

The functional nanomaterial includes a functional inorganic nanomaterial or a functional organic nanomaterial.

In some embodiments, the functional inorganic nanomaterial comprises ferric oxide.

In some embodiments, the functional organic nanomaterial comprises an aggregation-induced luminescent material, an organic fluorescent dye or up-conversion nanoparticles.

In some embodiments, the aggregation-induced luminescent material is tetraphenyl ethylene; the organic fluorescent dye is rhodamine B; the up-conversion nanoparticle is $NaTF_4:Yb/Er$.

The present disclosure provides a method for preparing the fluorescent metal-organic framework superstructure compound composited with functional nanomaterials described in above technical schemes, wherein comprising the steps of:

When the functional nanomaterial includes a functional inorganic nanomaterial, injecting the functional inorganic nanomaterial and the soluble rare earth salt solution from the first feeding pipe 1, flowing through the capillary 3 into the mixing channel 4, injecting the oil phase solution from the second feeding pipe 2 into the mixing channel 4, and forming droplets of the rare earth salt solution in the mixing channel 4;

Subjecting the droplets of the rare earth salt solution flowing out of the mixing channel 4 to a coordination reaction with an organic ligand solution to obtain the fluorescent metal-organic framework superstructure compound;

When the functional nanomaterial includes a functional organic nanomaterial, injecting the soluble rare earth salt solution from the first feeding pipe 1, flowing through the capillary 3 into the mixing channel 4, injecting the functional organic nanomaterial and the oil phase solution from the second feeding pipe 2 into the mixing channel 4, and forming droplets of the rare earth salt solution in the mixing channel 4;

Subjecting the droplets of the rare earth salt solution flowing out of the mixing channel 4 to a coordination reaction with an organic ligand solution to obtain the fluorescent metal-organic framework superstructure compound.

In some embodiments, a mass ratio of the functional inorganic nanomaterial to the soluble rare earth salt is (2.2-6.5): 36; and a mass ratio of the functional organic nanomaterial to the oil phases is (0.05-0.6): 5.

The present disclosure provides an application of the fluorescent metal-organic framework superstructure compound described in above technical schemes in the detection of biological samples for non-therapeutic purposes.

In some embodiments, the biological sample is tetracycline or ferric chloride.

In some embodiments, the detection includes qualitative detection or quantitative detection; the qualitative detection is performed based on the change of fluorescence color after the fluorescent metal-organic framework superstructure compound is contacted with the biological sample;

The quantitative detection is performed based on the change of the relative intensity of fluorescence after the fluorescent metal-organic framework superstructure compound is contacted with the biological sample.

The present disclosure provides a method for preparing a fluorescent metal-organic framework superstructure compound, comprising the steps of: providing a microfluidic mixing device comprising a first feeding pipe 1, a capillary 3 having a feeding end in communication with a discharge end of the first feeding pipe 1, a mixing channel 4 having a feeding end in communication with a discharge end of the capillary 3, further comprising a second feeding pipe 2 having a discharge end in communication with a feeding end of the mixing channel 4; Injecting a soluble rare earth salt solution from the first feeding pipe 1, flowing through the capillary 3 into the mixing channel 4, injecting an oil phase solution from the second feeding pipe 2 into the mixing channel 4, and forming droplets of the rare earth salt solution in the mixing channel 4; Subjecting the droplets of the rare earth salt solution flowing out of the mixing channel 4 to a coordination reaction with an organic ligand solution to obtain the fluorescent metal-organic framework superstructure compound. In the present disclosure, the soluble rare earth salt solution is transported from the capillary to the mixing channel through the above microfluidic mixing device. In the mixing channel, when the oil phase solution entered from the second feeding pipe is mixed with the soluble rare earth salt solution, individual droplet of the soluble rare earth salt solution is formed at ends of the capillary 3 under shear action of the oil phase solution on the soluble rare earth salt solution; the droplets of the rare earth salt solution flowing out of the mixing channel 4 are subjected to a coordination reaction with an organic ligand solution to obtain the fluorescent metal-organic framework superstructure compound. The preparation method provided by the present disclosure can prepare the fluorescent metal-organic framework superstructure compound in the form of a sphere which is self-assembled from MOFs nanorods, and the particle size distribution of the sphere is uniform. The results of the examples show that the preparation method provided by the present disclosure obtains fluorescent metal-organic framework superstructure compounds in the form of spheres, the diameter of the spheres is 150-260 μm, and the particle size distribution of the spheres is uniform. Compared with MOFs in nanorods, spherical superstructure compounds have more functional sites, can be composited with functional nanomaterials, and have higher sensitivity and selectivity when applied to bioenergy detection.

Compared with the preparation method using a traditional hydrothermal reactor, the preparation method provided by the present disclosure is simple and easy to control.

DETAILED DESCRIPTION OF THE EMBODIMENTS

Figure 1:
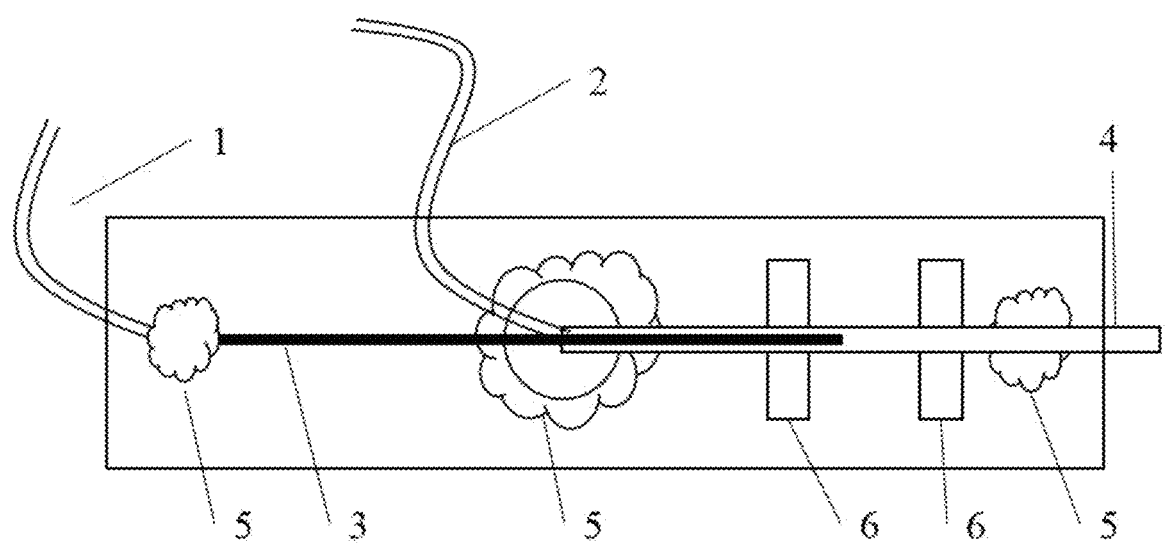
FIG. 1 is a schematic diagram of a microfluidic mixing device in Example 1 of the present disclosure, where 1 is first feeding pipe, 2 is second feeding pipe, 3 is capillary, 4 is mixing channel, 5 is epoxy resin, and 6 is double-sided tape.

The present disclosure provides a method for preparing a fluorescent metal-organic framework superstructure compound, comprising the steps of Providing a microfluidic mixing device comprising a first feeding pipe 1, a capillary 3 having a feeding end in communication with a discharge end of the first feeding pipe 1, a mixing channel 4 having a feeding end in communication with a discharge end of the capillary 3, further comprising a second feeding pipe 2 having a discharge end in communication with a feeding end of the mixing channel 4;

Injecting a soluble rare earth salt solution from the first feeding pipe 1, flowing through the capillary 3 into the mixing channel 4, injecting an oil phase solution from the second feeding pipe 2 into the mixing channel 4, and forming droplets of the rare earth salt solution in the mixing channel 4;

Subjecting the droplets of the rare earth salt solution flowing out of the mixing channel 4 to a coordination reaction with an organic ligand solution to obtain the fluorescent metal-organic framework superstructure compound.

In the present disclosure, the microfluidic mixing device includes a first feeding pipe 1. In the present disclosure, the material of the first feeding pipe 1 is preferably polyvinyl chloride; in the present disclosure, the first feeding pipe 1 preferably has an inner diameter of 0.45-0.6 mm, more preferably 0.5, and an outer diameter of 0.7-0.86 mm, more preferably 0.75 mm.

In the present disclosure, the microfluidic mixing device includes a capillary 3 having a feeding end in communication with the discharging end of the first feeding tube 1. In the present disclosure, the material of the capillary 3 is preferably glass, the capillary 3 is preferably a cone, the bottom surface of the capillary 3 preferably has an inner diameter of 0.05-0.15 mm, more preferably 0.1 mm, and an outer diameter of 0.3-0.4 mm, more preferably 0.38 mm; the capillary 3 preferably has a length of 11-12 cm; in an embodiment, the bottom surface of the capillary 3 is the feeding end, and the vertex end is the discharge end. The present disclosure preferably inserts the feeding end of the capillary into the first feeding pipe, and the present disclosure has no special requirements on the insertion length of the feeding end of the capillary.

In the present disclosure, the conical capillary is preferably obtained by processing a cylindrical capillary through a needle puller. After the conical capillary is formed, the present disclosure preferably performs post-processing on the conical capillary, and the post-processing preferably includes grinding, the mesh number of the sandpaper for grinding is preferably 2000 meshes. The present disclosure ensures that the outer surface of the conical capillary is smooth by grinding the conical capillary.

In the present disclosure, the microfluidic mixing device includes a mixing channel 4 having a feeding end in communication with the discharge end of the capillary 3. In the present disclosure, the discharge end of the capillary 3 is preferably communicated with the mixing channel 4 coaxially, and the length of the vertex end of the conical glass capillary extending into the mixing channel 4 is preferably 3-7 cm, more preferably 4-5 cm. In the present disclosure, the material of the mixing channel 4 is preferably polyvinyl chloride; in the present disclosure, the mixing channel 4 preferably has an inner diameter of 0.45-0.6 mm, more preferably 0.5, and an outer diameter of 0.7-0.86 mm, more preferably 0.75 mm; the length of the mixing channel 4 is preferably 10-11 cm, and a ratio of the length of the capillary 3 extending into the mixing channel 4 to the length of the mixing channel 4 is 0.3-0.7.

In the present disclosure, the microfluidic mixing device further includes a second feeding pipe 2, and the material of the second feeding pipe 2 is preferably polyvinyl chloride; in the present disclosure, the second feeding pipe 2 preferably has an inner diameter of 0.35-0.45 mm, more preferably 0.38 mm, and an outer diameter of 0.47-0.57 mm, more preferably 0.5 mm; In the present disclosure, the discharge end of the second feeding pipe 2 is communicated with the feeding end of the mixing channel 4. In the present disclosure, the second feeding pipe 2 is preferably inserted into the gap between the mixing channel 4 and the capillary 3. The present disclosure has no special requirements on the insertion length of the second feeding pipe 2.

In the present disclosure, the microfluidic mixing device further includes a base, and the first feeding pipe 1, the second feeding pipe 2, the capillary 3 and the mixing channel 4 are fixed on the surface of the base.

In the present disclosure, the microfluidic mixing device is shown in FIG. 1, and the assembling method of the microfluidic mixing device preferably includes: fixing the capillary 3 on the base, fixing the mixing channel 4 on the right side of the capillary 3, and communicating with the capillary 3, and the length of the vertex end of the capillary 3 extending into the mixing channel 4 is preferably 3-7 cm; communicating the first feeding pipe with the left end of the capillary 3, and communicating the second feeding pipe 2 with the left end of the mixing channel 4. In a specific embodiment, the second feeding pipe is connected to the gap between the capillary 3 and the mixing channel; In the present disclosure, epoxy resin is preferably used to seal the connection of the above pipes. In the present disclosure, the capillary 3 is preferably fixed on the base by epoxy resin. In the present disclosure, the mixing channel is preferably fixed on the base by epoxy resin and double-sided tape.

In the present disclosure, the above device is preferably subjected to post-treatment to obtain the microfluidic mixing device. In the present disclosure, the post-treatment preferably includes air-drying. In the present disclosure, the air-drying time is preferably 12 h.

In the present disclosure, the soluble rare earth salt solution is injected from the first feeding pipe 1 and flows through the capillary 3 into the mixing channel 4. In the present disclosure, the soluble rare earth salt solution into the mixing channel 4 preferably has a flow rate of 5-15 μL/min, more preferably 7-12 μL/min, most preferably 8-10 μL/min; in the present disclosure, the soluble rare earth salt solution preferably has a molar concentration of 300-400 mmol/L, more preferably 320-380 mmol/L, and most preferably 330-350 mmol/L. In the present disclosure, the soluble rare earth salt solution preferably includes any one or two of a soluble europium salt solution, a soluble terbium salt solution and a soluble dysprosium salt solution, and the soluble europium salt solution preferably includes europium acetate and/or europium nitrate, the soluble terbium salt preferably includes terbium acetate and/or terbium nitrate, and the soluble dysprosium salt preferably includes dysprosium acetate and/or dysprosium nitrate. In a specific embodiment, when the soluble rare earth salt includes any two of the above substances, the soluble rare earth salt preferably includes a mixture of soluble europium salt and soluble terbium salt or a mixture of soluble europium salt and soluble dysprosium salt.

The present disclosure prepares metal-organic framework superstructure compounds with different fluorescent colors by adjusting the type and mass ratio of the soluble rare earth salt solution. In a specific embodiment, when the soluble rare earth salt includes europium acetate and europium nitrate, the product is a red metal-organic framework superstructure compound; in a specific embodiment, the mass ratio of the europium acetate to europium nitrate is 0.0474: 0.0963;

When the soluble rare earth salt includes europium acetate and terbium nitrate, and the mass ratio of europium acetate to terbium nitrate is 0.0166:0.1402, the product is an orange metal-organic framework superstructure compound;

When the soluble rare earth salt includes europium acetate and terbium nitrate, and the mass ratio of europium acetate to terbium nitrate is 0.0142:0.1435, the product is a yellow metal-organic framework superstructure compound;

When the soluble rare earth salt includes terbium acetate and terbium nitrate, the product is a green metal-organic framework superstructure compound, and in a specific embodiment, the mass ratio of the terbium acetate to terbium nitrate is 0.0484:0.0979;

When the soluble rare earth salt includes europium acetate and dysprosium nitrate, and the mass ratio of terbium acetate to terbium nitrate is 0.0415:0.0865, the product is a cyan metal-organic framework superstructure compound;

When the soluble rare earth salt includes dysprosium acetate and dysprosium nitrate, the product is a blue metal-organic framework superstructure compound, in a specific embodiment, the mass ratio of the dysprosium acetate to dysprosium nitrate is 0.0484:0.0947;

When the soluble rare earth salt includes europium acetate and dysprosium nitrate, and the mass ratio of europium acetate to dysprosium nitrate is 0.0236:0.1264, the product is a purple metal-organic framework superstructure compound.

In the present disclosure, the soluble rare earth salt solution is preferably prepared by the following method: subjecting the soluble rare earth salt and water to a first mixing to obtain a soluble rare earth salt solution; in the present disclosure, the water is preferably deionized water, the first mixing is preferably performed under stirring, and the stirring speed is preferably 600-1500 rpm, more preferably 800-1200 rpm, the stirring time is preferably 8-15 min, and the stirring is preferably magnetic stirring.

In the present disclosure, the soluble rare earth salt solution is preferably injected into the first feeding pipe 1 by a syringe pump, and the flow rate of the rare earth salt solution is preferably controlled by a syringe pump in the present disclosure.

In the present disclosure, the oil phase solution is injected from the second feeding pipe into the mixing channel 4; in the present disclosure, the oil phase solution into the mixing channel 4 preferably has a flow rate of 150-250 µL/min, more preferably 175-220 µL/min, most preferably 180-200 µL/min.

In the present disclosure, the oil phase solution preferably includes an oil phase and a polar organic solvent, the oil phase is preferably a surfactant, and the polar organic solvent is preferably n-amyl alcohol and/or n-butanol. In the present disclosure, the mass percentage of the surfactant in the oil phase solution is preferably 0.05-0.15%, more preferably 0.08-0.1%; in the present disclosure, the surfactant preferably includes Span 80 and/or Span 60.

In the present disclosure, the oil phase solution is preferably prepared by the following method: subjecting the oil phase and the organic solvent to a second mixing to obtain an oil phase solution; in the present disclosure, the second mixing is preferably performed under stirring, the stirring speed is preferably 600-1500 rpm, more preferably 800-1200 rpm, the stirring time is preferably 10-20 min, and the stirring is preferably magnetic stirring.

In the present disclosure, the oil phase solution is preferably injected into the second feeding pipe 2 by a syringe pump, and the flow rate of the oil phase solution is preferably controlled by a syringe pump in the present disclosure.

In the present disclosure, droplets of the rare earth salt solution are formed in the mixing channel 4 under the shearing action of the oil phase solution; in the present disclosure, the droplets size of the rare earth salt solution is adjusted by controlling the flow rates of the rare earth salt solution and the oil phase solution, so that the droplets size of the rare earth salt solution is more uniform.

In the present disclosure, the droplets of the rare earth salt solution flowing out of the mixing channel is subjected to a coordination reaction with an organic ligand solution to obtain the fluorescent metal-organic framework superstructure compound.

In the present disclosure, the organic ligand solution preferably includes an organic ligand and a polar organic solvent, and the organic ligand solution preferably has a molar concentration of 80-90 mmol/L, more preferably 83-95 mmol/L. In the present disclosure, the organic ligand is preferably trimesic acid; the polar organic solvent is preferably n-amyl alcohol and/or n-butanol.

In the present disclosure, the organic ligand solution is preferably prepared by the following method: subjecting trimesic acid and a polar organic solvent to a third mixing to obtain an organic ligand solution; in the present disclosure, the temperature of the third mixing is preferably 60-70° C., the third mixing is preferably carried out under stirring, the stirring speed is preferably 600-1500 rpm, more preferably 800-1200 rpm, and the stirring time is preferably 10-20 min, the stirring is preferably magnetic stirring.

In the present disclosure, the time of the coordination reaction is preferably 15-30 min, more preferably 20 min, and the temperature of the coordination reaction is preferably room temperature.

In the present disclosure, the soluble rare earth salt solution is transported from the capillary to the mixing channel through the above microfluidic mixing device. In the mixing channel, when the oil phase solution entered from the second feeding pipe is mixed with the soluble rare earth salt solution, individual droplet of the soluble rare earth salt solution is formed at ends of the capillary 3 under the shearing action of the oil phase solution on the soluble rare earth salt solution. The droplets flowing out of the mixing channel 4 are subjected to a coordination reaction with the organic ligand solution to obtain the fluorescent metal-organic framework superstructure compound; The preparation method provided by the present disclosure can prepare a spherical fluorescent metal-organic framework superstructure compound through self-assembly, and the particle size distribution of the spheres is uniform. The present disclosure can prepare metal-organic framework superstructure compounds with different fluorescent colors by adjusting the type and mass ratio of the soluble rare earth salt solution. In the present disclosure, the droplets size of the rare earth salt solution is adjusted by controlling the flow rates of the rare earth salt solution and the oil phase solution, so that the droplets size of the rare earth salt solution is more uniform.

In the present disclosure, the product of the coordination reaction is preferably subjected to post-treatment to obtain a fluorescent metal-organic framework superstructure compound. In the present disclosure, the post-treatment preferably includes solid-liquid separation and drying. There are no special requirements on the implementation process; the present disclosure preferably dries the solid product after solid-liquid separation. In the present disclosure, the drying temperature is preferably 100-200° C., more preferably 150° C., and the drying time is preferably 10-15 h, more preferably 12 h.

The present disclosure provides a fluorescent metal-organic framework superstructure compound obtained by the preparation method described in the above technical schemes. The compound prepared in the embodiment of the present disclosure has the structure shown in formula I, Ln represents a rare earth element, the shape is a sphere, and the diameter of the sphere is 150-260 μm.

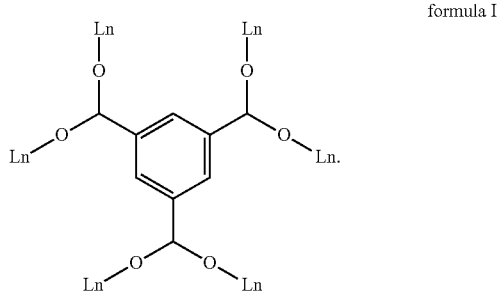

formula I

In the present disclosure, the shape of the fluorescent metal-organic framework superstructure compound is a sphere, and the spherical structure is formed by the self-assembly of MOFs nanorods when a single droplet of the soluble rare earth salt solution undergoes a coordination reaction with an organic ligand solution. In the present disclosure, the fluorescent metal-organic framework superstructure compound preferably has a diameter of 150-260 μm, more preferably 175-250 μm, and most preferably 200-225 μm.

In the present disclosure, the fluorescent metal-organic framework superstructure compound has any fluorescent color among red, orange, yellow, green, cyan, blue and purple. The metal-organic framework superstructure compound with different fluorescent colors obtained by the present disclosure is prepared by adjusting the type and mass ratio of the soluble rare earth salt solution.

The present disclosure provides a fluorescent metal-organic framework superstructure compound composited with functional nanomaterials, comprising a fluorescent metal-organic framework superstructure compound and a functional nanomaterial supported on the surface of the fluorescent metal-organic framework superstructure compound;

The fluorescent metal-organic framework superstructure compound is the fluorescent metal-organic framework superstructure compound described in the above technical scheme;

The functional nanomaterials include functional inorganic nanomaterials or functional organic nanomaterials.

The fluorescent metal-organic framework superstructure compound composited with functional nanomaterials provided by the present disclosure includes the fluorescent metal-organic framework superstructure compound described in the above technical scheme.

The fluorescent metal-organic framework superstructure compound composited with functional nanomaterials provided by the present disclosure, comprising a fluorescent metal-organic framework superstructure compound and a functional nanomaterial supported on the surface of the fluorescent metal-organic framework superstructure compound; In the present disclosure, the functional nanomaterials include functional inorganic nanomaterials or functional organic nanomaterials. In the present disclosure, the functional inorganic nanomaterials preferably include ferric oxide, and the functional organic nanomaterials preferably include aggregation-induced emission (AIE) materials, organic fluorescent dyes or up-conversion nanoparticles (UCNPs); In specific embodiments, the AIE material is preferably a tetraphenylethylene (TPE) material, the organic fluorescent dye is preferably Rhodamine B, and the UCNPs is preferably $NaTF_4$:Yb/Er.

In the present disclosure, the difference between the preparation method of the fluorescent metal-organic framework superstructure compound composited with functional nanomaterials and the preparation method of the fluorescent metal-organic framework superstructure compound is as follows: when the functional nanomaterial preferably includes a functional inorganic nanomaterial, the functional inorganic nanomaterial and the soluble rare earth salt solution are simultaneously injected from the first feeding pipe 1; when the functional nanomaterial preferably includes a functional organic nanomaterial, the functional organic nanomaterial and the oil phase solution are simultaneously injected from the second feeding pipe 2.

In the present disclosure, when the functional nanomaterial preferably includes a functional inorganic nanomaterial, the mass ratio of the functional inorganic nanomaterial to the soluble rare earth salt is preferably (2.2-6.5): 36, more preferably 4.3:36; In the present disclosure, the functional inorganic nanomaterial and the soluble rare earth salt solution are preferably subjected to a fourth mixing to obtain a mixed solution, and then the mixed solution is injected from the first feeding pipe 1. In the present disclosure, the fourth mixing is preferably carried out under ultrasound, the time of the ultrasound is 10-15 min, and the present disclosure has no special requirements on the power of the ultrasound.

In the present disclosure, when the functional nanomaterial preferably includes a functional organic nanomaterial, the mass ratio of the functional organic nanomaterial to the oil phase is preferably (0.05-0.6): 5, more preferably 0.5:5. In the present disclosure, the functional organic nanomaterials and the oil phase solution are preferably subjected to a fifth mixing to obtain a mixed oil phase solution, and then the mixed oil phase solution is injected from the second feed pipe 2. In the present disclosure, the fifth mixing is preferably performed under stirring, the stirring speed is preferably 1000-1200 rmp, and the stirring is preferably magnetic stirring.

The present disclosure provides the application of the fluorescent metal-organic framework superstructure compound described in the above technical scheme in the detection of biological samples for non-therapeutic purposes.

In the present disclosure, the fluorescent metal-organic framework superstructure compound is preferably used as a detection reagent of a biological sample for non-therapeutic purposes, which detects the substance to be detected using changes of fluorescence intensity from strong to weak when the fluorescence quenching occurs between the fluorescent metal-organic framework superstructure compound and the substance to be detected in the biological sample.

In the present disclosure, the fluorescent metal-organic framework superstructure compound is composited with functional nanomaterials to obtain a fluorescent metal-organic framework superstructure compound composited with functional nanomaterials, when the fluorescent metal-organic framework superstructure compound composited with functional nanomaterials is used in the detection of biological samples for non-therapeutic purposes, the present disclosure uses the changes of fluorescence intensity caused by the fluorescence quenching of the fluorescent metal-organic framework superstructure compound and the substance to be detected in the biological sample to achieve qualitative detection. By preparing the standard of the sample to be tested and the linear fitting curve of the relative fluorescence intensity, the concentration of the sample to be detected can be quantitatively detected. When the functional nanomaterial and the same substance to be detected in the biological sample do not undergo fluorescence quenching, the substance to be detected can be detected using the changes of fluorescence color.

The technical schemes of the present disclosure will be clearly and completely described below with reference to the embodiments of the present disclosure. Obviously, the described embodiments are only some, but not all, embodiments of the present disclosure. Based on the embodiments of the present disclosure, all other embodiments obtained by those of ordinary skill in the art without creative efforts shall fall within the protection scope of the present disclosure.

Example 1

As shown in FIG. 1, the microfluidic mixing device includes a first feeding pipe 1, a second feeding pipe 2, a capillary 3 and a mixing channel 4; Using a glass slide as the base, a cylindrical glass capillary with an inner diameter of 0.1 mm was processed into a conical pipe by a needle puller, smoothed with sandpaper, and then fixed on the glass slide with epoxy resin. A polyvinyl chloride pipe with an inner diameter of 0.5 mm was placed on the right side of the capillary, and the vertex end of the conical glass capillary was extended into the polyvinyl chloride pipe by 3 cm to form a coaxial structure. Another PTFE pipe with an inner diameter of 0.5 mm was communicated with the bottom surface of the conical glass capillary on the left, and a third PTFE pipe was connected to the gap between the cylindrical glass capillary and the PVC pipe. Finally, the pipe and the gap were fixed and sealed with epoxy resin and double-sided tape, and then air-dried for 12 h for use.

0.0474 g of europium acetate and 0.0963 g of europium nitrate were weighed and added into a 5 g sample bottle, then deionized water was added to the sample bottle, a stirrer was added therein, and the resulting mixture was stirred at 1000 rmp for 10 min to prepare 1 g of rare earth ion solution with a concentration of 360 mmol/L.

9.5 g of n-amyl alcohol solution was weighed and added into a 20 g sample bottle, 0.5 g of surfactant Span 80 was added into the sample bottle, a stirrer was added therein, the resulting mixture was stirred at 1200 rmp for 20 min to prepare an oil phase solution with a mass fraction of Span 80 of 5% wt.

0.3532 g of trimesic acid was weighed and added in a 50 mL beaker, then 20 g of n-amyl alcohol was added into the beaker, a stirrer was added therein, the heating temperature of the magnetic stirring table was adjusted to 50° C., the stirring speed was 800 rmp, and the resulting mixture was stirred for 20 min to obtain an organic ligand solution with a concentration of 84 mmol/L.

Figure 2:
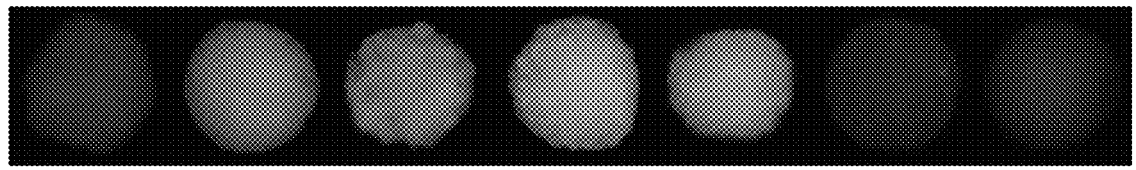
FIG. 2 is a fluorescence color developing picture of the products prepared by the Examples 1-7 of the present disclosure.
Figure 3:
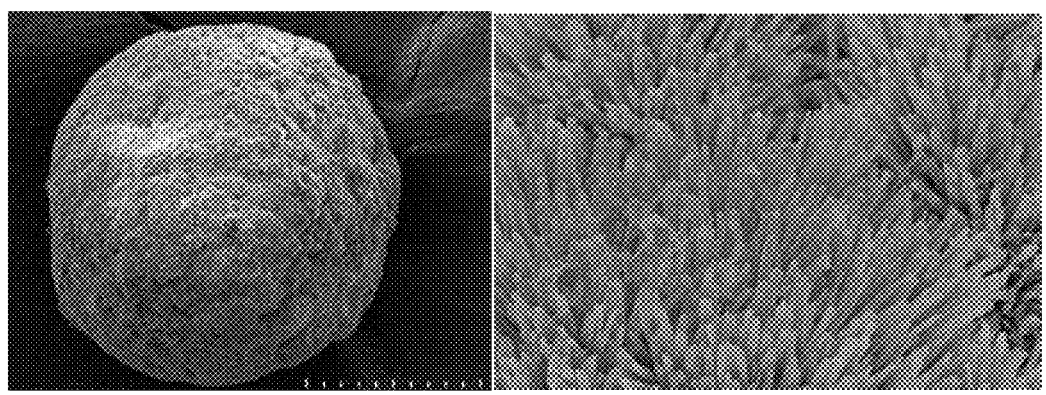
FIG. 3 is an electron microscope photograph of the product prepared by Example 1 of the present disclosure.
Figure 4:
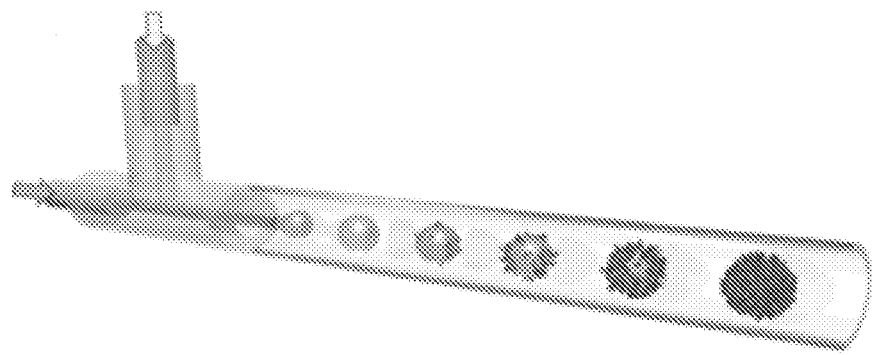
FIG. 4 is a schematic diagram of the preparation process of Examples 8-11 of the present disclosure.

The soluble rare earth salt solution was loaded into a 1 mL syringe, the syringe pump was connected to the first feeding pipe 1 of the microfluidic mixing device, the oil phase solution was loaded into a 10 mL syringe, the syringe pump was connected to the second feeding pipe 2 of the microfluidic mixing device, and the flow rate of the soluble rare earth salt solution was adjusted to 200 μL/min, and the flow rate of the oil phase solution was 10 μL/min. The droplets were formed by the shearing action of the oil phase solution on the soluble rare earth salt solution, then the droplets flowing out of the microfluidic mixing device were reacted with the organic ligand solution for 20 min. Then the solid product obtained by the solid-liquid separation of the coordination reaction liquid was placed in a vacuum oven to dry at 150° C. for 12 h, and the fluorescent metal-organic framework superstructure compound was obtained with a spherical shape and a size of 150 m, which can emit red light under the excitation of 365 nm ultraviolet light (as shown in the first picture on the left of FIG. 2), the electron microscope photograph of the product prepared in Example 1 is shown in FIG. 3. As shown in the figure on the left of FIG. 3, the fluorescent metal-organic framework superstructure compound prepared by the present disclosure is spherical which is self-assembled by nanorods. (as shown in the picture on the right of FIG. 3).

Examples 2-7

Fluorescent metal-organic framework superstructure compounds with orange, yellow, green, cyan, blue and purple fluorescence were prepared according to the types and mass ratios of soluble rare earth salts shown in Table 1. Other preparation conditions were the same as those in Example 1.

TABLE 1

Types and preparation ratios of soluble rare earth salts in Examples 2-7

| Color\rare earth salt | Europium acetate (g) | Europium nitrate (g) | Terbium acetate (g) | Terbium nitrate (g) | Dysprosium acetate (g) | Dysprosium nitrate (g) |
|---|---|---|---|---|---|---|
| red | 0.0474 | 0.0963 | — | — | — | — |
| orange | 0.0166 | — | — | 0.1402 | — | — |
| yellow | 0.0142 | — | — | 0.1435 | — | — |
| green | — | — | 0.0484 | 0.0979 | — | — |

TABLE 1-continued

Types and preparation ratios of soluble rare earth salts in Examples 2-7

| Color\rare earth salt | Europium acetate (g) | Europium nitrate (g) | Terbium acetate (g) | Terbium nitrate (g) | Dysprosium acetate (g) | Dysprosium nitrate (g) |
|---|---|---|---|---|---|---|
| cyan | 0.0415 | — | — | — | — | 0.0865 |
| blue | — | — | — | — | 0.0484 | 0.0947 |
| purple | 0.0236 | — | — | — | — | 0.1264 |

Example 8

The preparation method is the same as that of Example 1, except that 0.005 g of ferric oxide powder was weighed and added to the soluble rare earth salt solution prepared in Example 1, and ultrasonically dispersed for 10 min to obtain a mixed solution of ferric oxide and soluble rare earth salt. The fluorescent metal-organic framework superstructure compound composited with functional nanomaterials obtained was denoted as MOFs@magnetic iron tetroxide.

Example 9

The preparation method is the same as that of Example 4, except that 0.006649 g of tetraphenylethylene was added to the oil phase solution, a stirrer was added therein, the resulting mixture was stirred at 1000 rpm for 10 min to obtain a mixed oil phase solution. The fluorescent metal-organic framework superstructure compound composited with functional nanomaterials obtained was denoted as AIE@MOFs.

Figure 5:
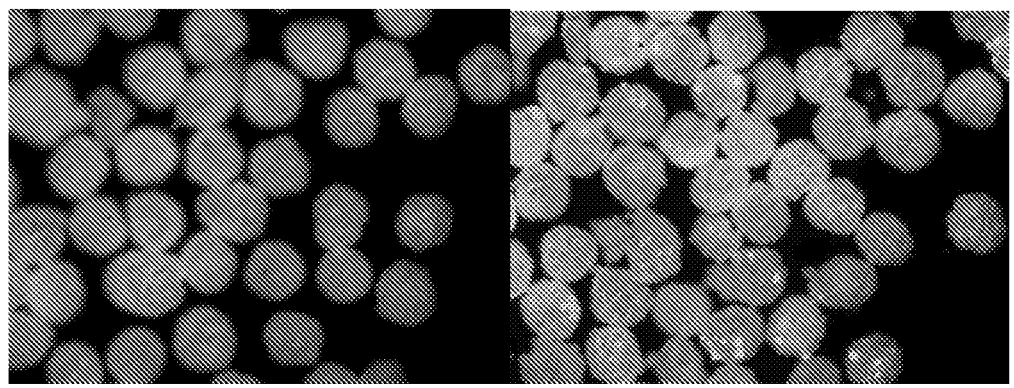
FIG. 5 shows the comparison of the fluorescence color of the products prepared by Example 4 and Example 9 of the present disclosure.
Figure 6:
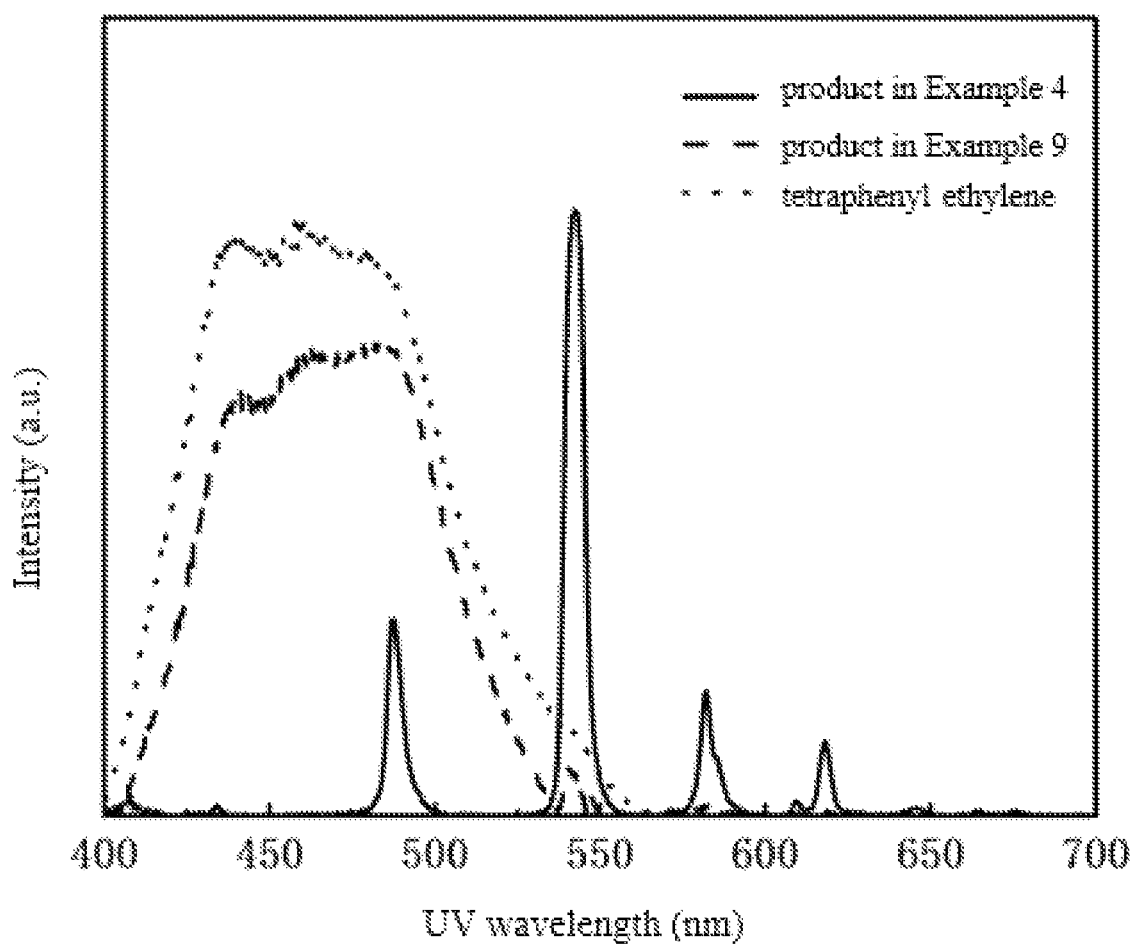
FIG. 6 shows the comparison of the fluorescence intensity of the products prepared in Example 4 and Example 9 of the present disclosure.

It can be concluded from FIG. 5 and FIG. 6 that the shape of the fluorescent metal-organic framework superstructure compound prepared in Example 4 is spherical, and under the irradiation of ultraviolet light, the color is green (as shown in the picture on the left in FIG. 5), while the AIE@MOFs prepared in Example 9 is blue (as shown in the picture on the right in FIG. 5) under the irradiation of ultraviolet light; FIG. 6 shows the light intensity of the products prepared in Example 4 and Example 9 and tetraphenylethylene under the ultraviolet light of 400-700 nm. It can be concluded from FIG. 6 that the fluorescence color of the product prepared in Example 9 changes from green to blue, since it is loaded with tetraphenylethylene.

Example 10

The preparation method is the same as that of Example 4, except that 0.05 g of Rhodamine B was added to the oil phase solution, then a stirrer was added therein, the resulting mixture was stirred at 1000 rpm for 10 min to obtain a mixed oil phase solution. The fluorescent metal-organic framework superstructure compound composited with functional nanomaterials obtained was denoted as organic dye@MOFs.

Figure 7:
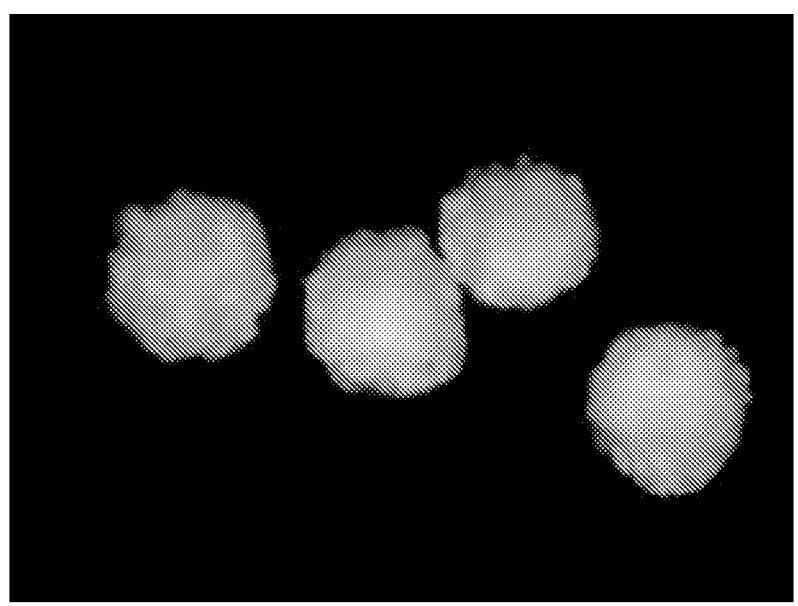
FIG. 7 shows the comparison of the fluorescence color of the products prepared by Example 4 and Example 10 of the present disclosure.
Figure 8:
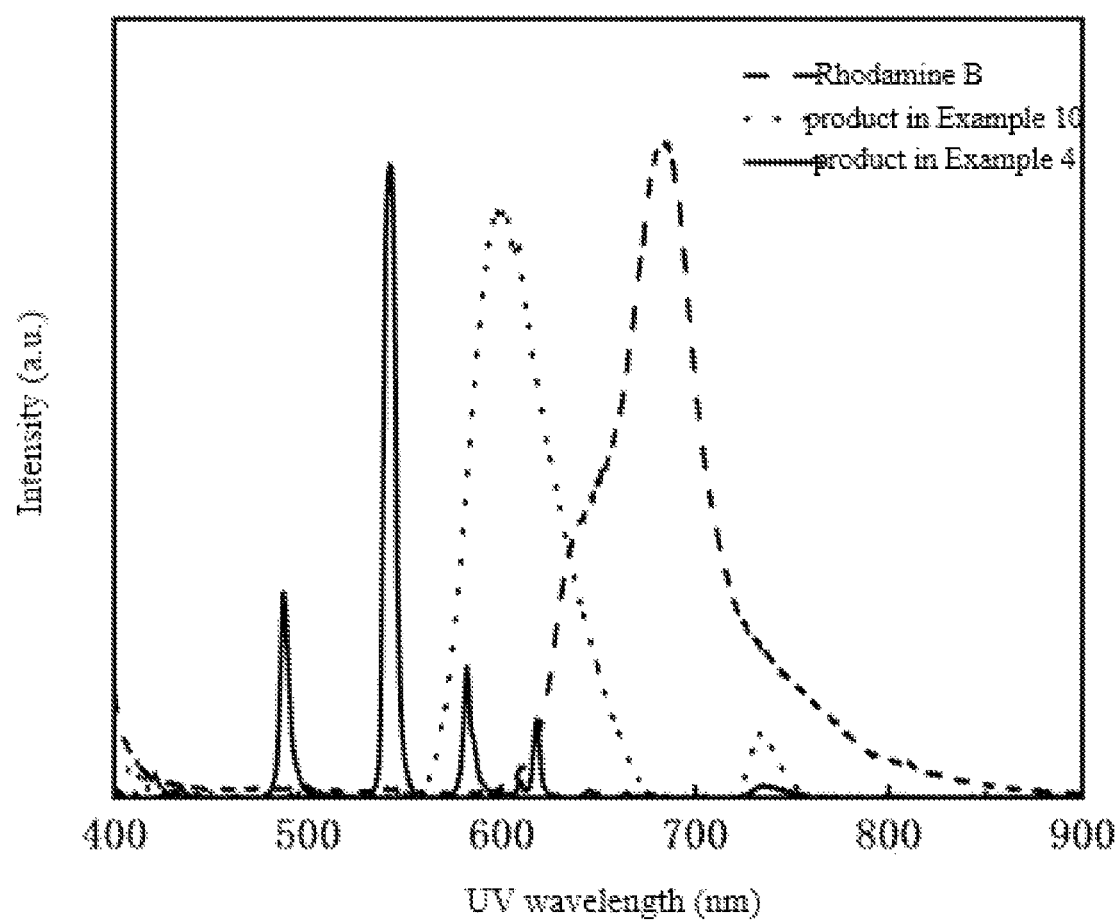
FIG. 8 shows the comparison of the fluorescence intensity of the products prepared in Example 4 and Example 10 of the present disclosure.

It can be concluded from FIG. 7 and FIG. 8 that the organic dye@MOFs prepared in Example 10 is spherical, and under the irradiation of ultraviolet light, the color is red; FIG. 8 shows the light intensity of the products prepared in Example 4 and Example 9 and Rhodamine B under the ultraviolet light of 400-900 nm. It can be concluded from FIG. 8 that the fluorescence color of the product prepared in Example 10 changes from green to red, since it is loaded with Rhodamine B.

Example 11

The preparation method is the same as that of Example 1, except that 0.05 g of NaYF$_4$:Yb/Er was added to the oil phase solution, then a stirrer was added therein, the resulting mixture was stirred at 1000 rpm for 10 min to obtain a mixed oil phase solution. The fluorescent metal-organic framework superstructure compound composited with functional nanomaterials obtained was denoted as UCNPs@MOFs.

Example 12

Figure 9:
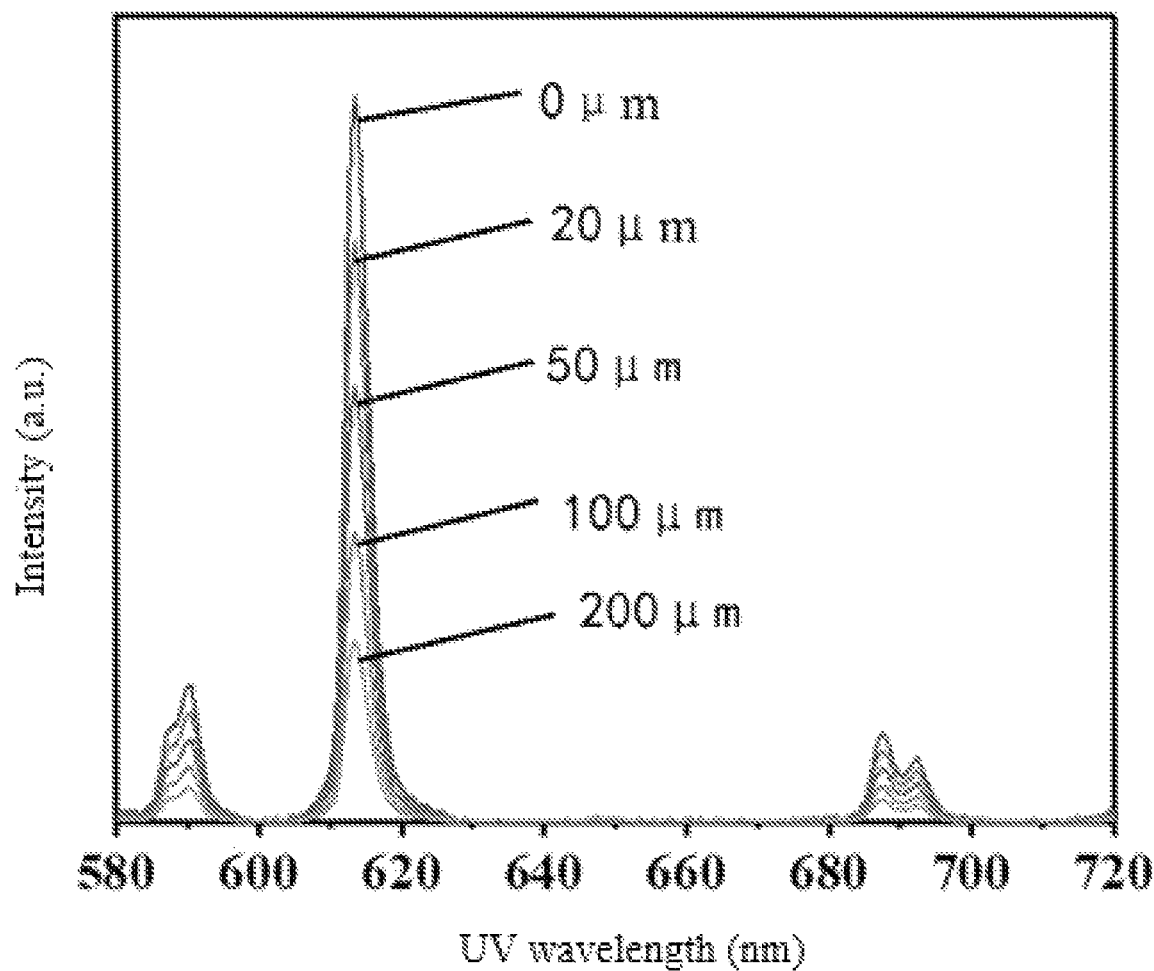
FIG. 9 is a graph showing the change in fluorescence intensity of red metal-organic framework superstructure compounds under different concentrations of tetracycline solutions in Example 12.
Figure 10:
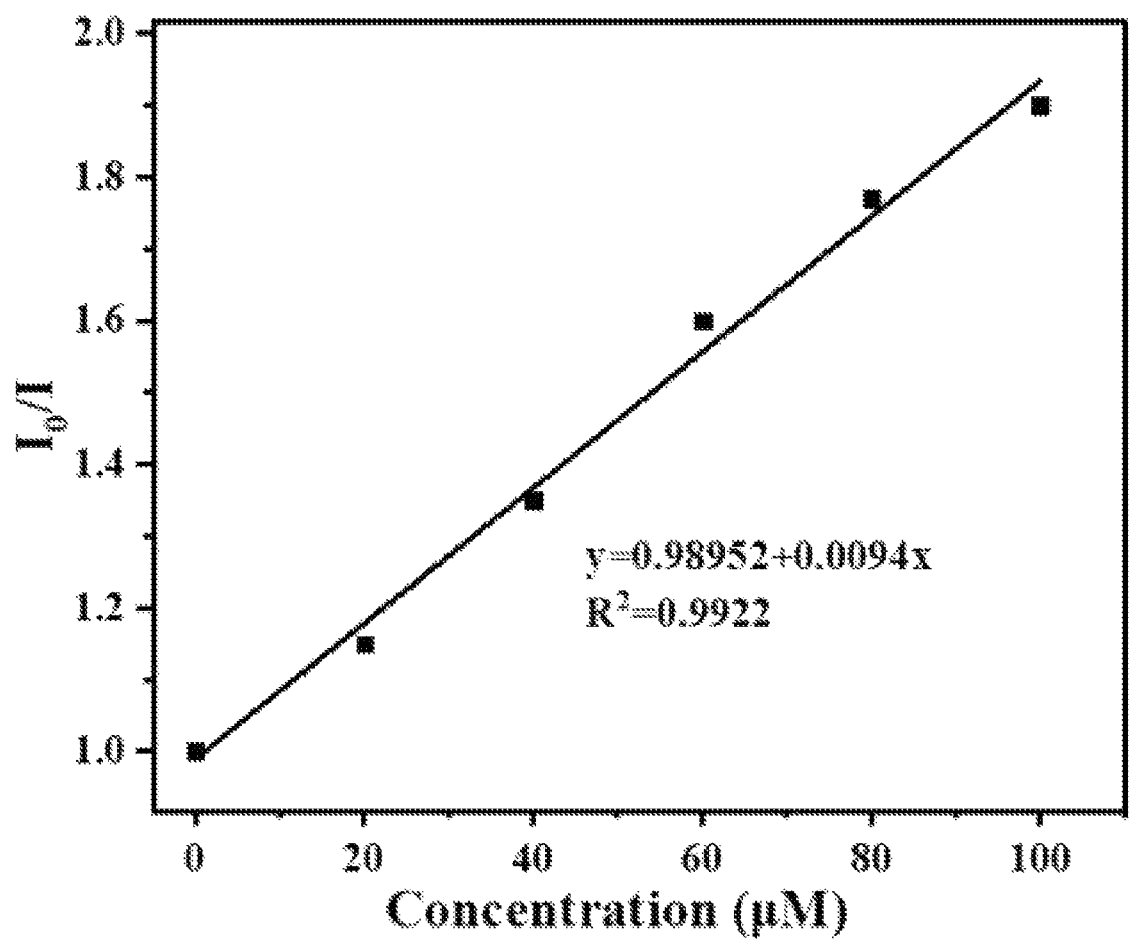
FIG. 10 is a linear fitting curve of the fluorescence intensity of red metal-organic framework superstructure compounds under different concentrations of tetracycline solutions in Example 12.

Commercially available tetracycline and deionized water were prepared into a series of tetracycline solutions with different concentrations (0, 20, 40, 60, 80, 100 μmol/L), and 0.3 mg of the red fluorescent metal-organic framework superstructure compound prepared in Example 1 was weighed and mixed with 6 mL of ultrapure water, and then magnetically stirred for 30 min to form a homogeneous suspension. The suspension was dropped onto the reagent detection area of the detection chip. After dropping tetracycline solutions with different concentrations in the reagent addition area of the detection chip, the magnetic control valve was turned on with an external magnet, so that the tetracycline solution and the detection reagent could be transported along the flow channel of the detection chip. After mixing for 3 min, the fluorescence intensity of the mixture was recorded at an excitation wavelength of 365 nm. The experimental results are shown in FIG. 9. As the concentration of tetracycline increases, the fluorescence intensity gradually weakens, indicating that the paper-based microfluidic chip loaded with red fluorescent metal-organic framework superstructure compound has a good detection effect on tetracycline; at the same time, according to the comparison with the initial fluorescence intensity, it can also be concluded that in the tetracycline solution with a concentration of 0-100 μmol/L, the fluorescence intensity has a good linear fit (as shown in FIG. 10). The linear equation of the linear fitting curve between the relative intensity of fluorescence and the mass concentration of tetracycline solution shown in FIG. 10 is: y=0.98952+0.0094 x, the linear range x is 0-100 μmol/L, and the $R^2$ of the fitting curve is 0.9922. Therefore, in the tetracycline solution with a concentration of 0-100 μmol/L, the red fluorescent metal-organic framework superstructure compound can be used to quantitatively analyze the content of tetracycline.

Moreover, the detection of tetracycline by fluorescent metal-organic framework superstructure compounds (Ln-BTC) is based on a fluorescence quenching mechanism, which is mainly related to the internal filtering effect (IFE) and photoinduced electron transfer (PET). Therefore, Ln-BTC with the same chemical configuration has similar chemical properties, and fluorescent metal-organic framework compounds with seven different colors prepared in Examples 1-7 can all detect tetracycline according to the mechanism of fluorescence quenching.

Example 13

Figure 11:
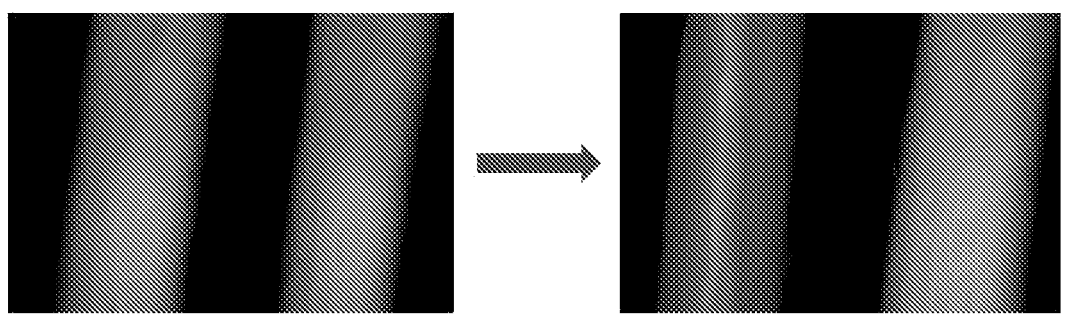
FIG. 11 shows the comparison of the discoloration of the detection results of Rhodamine B@green MOFs in Example 13.

0.5 mg of Rhodamine B@green MOFs prepared in Example 10 was dropped onto the reagent detection area of the detection chip, and spread evenly. 0.5 mg of ferric chloride was weighed and added to 50 mL of deionized water to prepare an aqueous solution of ferric chloride, and the aqueous solution of ferric chloride was dropped on the reagent addition area of the detection chip. As a comparison, 0.5 g of Rhodamine B@green MOFs was added to the reagent detection area of the same detection chip, and ordinary deionized water was added dropwise to the reagent addition area. After reacting the substances in the reagent detection area and the reagent addition area of the two chips for 4 min, a colorimetric comparison was performed to qualitatively detect whether iron ions were contained, as shown in FIG. 11. Since the fluorescence of the green metal-organic framework superstructure compound is easily quenched by iron ions, while the fluorescence of Rhodamine B is stable to iron ions, under the excitation of 365 nm ultraviolet light, the color of the detection area containing iron ions changed from the initial green to the final red (as shown in the picture on the right of FIG. 11), while the detection area (0) that does not contain iron ions remains a steady green color.

The above are only the preferred embodiments of the present disclosure. It should be pointed out that for those skilled in the art, without departing from the principles of the present disclosure, several improvements and modifications can be made, these improvements and modifications should be regarded as the protection scope of the present disclosure.

What is claimed is:

1. A method for preparing a fluorescent metal-organic framework superstructure compound, the method comprising:
   providing a microfluidic mixing device including a first feeding pipe, a capillary having a feeding end in communication with a discharge end of the first feeding pipe, a mixing channel having a feeding end in communication with a discharge end of the capillary, further including a second feeding pipe having a discharge end in communication with the feeding end of the mixing channel;
   injecting a solution of a soluble rare earth salt from the first feeding pipe, flowing through the capillary into the mixing channel;
   injecting an oil phase solution from the second feeding pipe into the mixing channel;
   forming droplets of the solution of the soluble rare earth salt in the mixing channel; and
   subjecting the droplets of the solution of the soluble rare earth salt flowing out of the mixing channel to a coordination reaction with a solution of an organic ligand to obtain the fluorescent metal-organic framework superstructure compound.

2. The method according to claim 1, wherein the solution of the soluble rare earth salt flowing into the mixing channel has a flow rate of 5-15 μL/min; and
   the oil phase solution flowing into the mixing channel has a flow rate of 150-250 μL/min.

3. The method according to claim 1, wherein the capillary is a cone, a bottom surface of the cone has an inner diameter of 0.05-0.15 mm, and an outer diameter of 0.3-0.4 mm;
   the first feeding pipe and the mixing channel have an inner diameter independently of 0.5-0.6 mm, and an outer diameter independently of 0.75-0.86 mm; and
   the second feeding pipe has an inner diameter of 0.35-0.45 mm, and an outer diameter of 0.47-0.57 mm.

4. The method according to claim 1, wherein the solution of the soluble rare earth salt has a molar concentration of 300-400 mmol/L; and
   wherein the solution of the soluble rare earth salt includes any one or two of a soluble europium salt solution, a soluble terbium salt solution and a soluble dysprosium salt solution.

5. The method according to claim 1, wherein the oil phase solution includes an oil phase and a polar organic solvent, and the oil phase solution has a mass percentage of 0.05-0.15%.

6. The method according to claim 5, wherein the oil phase is a surfactant.

7. The method according to claim 1, wherein the solution of the organic ligand includes the organic ligand and a polar organic solvent, and the solution of the organic ligand has a molar concentration of 80-90 mmol/L.

8. The method according to claim 1, wherein a ratio of an amount of substance of the soluble rare earth salt to the organic ligand is (30-40):(8-9).

9. The method according to claim 7, wherein the organic ligand is trimesic acid.

10. A fluorescent metal-organic framework superstructure compound prepared by the method according to claim 1, wherein the fluorescent metal-organic framework superstructure compound is a sphere, and the sphere has a diameter of 150-260 μm.

11. A fluorescent metal-organic framework superstructure compound composited with functional nanomaterials, comprising a fluorescent metal-organic framework superstructure compound and a functional nanomaterial supported on a surface of the fluorescent metal-organic framework superstructure compound; wherein
   the fluorescent metal-organic framework superstructure compound is the fluorescent metal-organic framework superstructure compound according to claim 10; and wherein
   the functional nanomaterial includes a functional inorganic nanomaterial or a functional organic nanomaterial, and wherein the functional inorganic nanomaterial includes ferric oxide.

12. The fluorescent metal-organic framework superstructure compound composited with functional nanomaterials according to claim 11, wherein the functional organic nanomaterial includes an aggregation-induced luminescent material, an organic fluorescent dye or up-conversion nanoparticles.

13. The fluorescent metal-organic framework superstructure compound composited with functional nanomaterials according to claim 12, wherein the aggregation-induced luminescent material is tetraphenyl ethylene; and the organic fluorescent dye is rhodamine B.

14. The method according to claim 2, wherein the solution of the soluble rare earth salt has a molar concentration of 300-400 mmol/L; and
   wherein the solution of the soluble rare earth salt includes any one or two of a soluble europium salt solution, a soluble terbium salt solution and a soluble dysprosium salt solution.

15. The method according to claim 2, wherein the oil phase solution includes an oil phase and a polar organic solvent, and the oil phase solution has a mass percentage of 0.05-0.15%.

16. The method according to claim 15, wherein the oil phase is a surfactant.

17. The method according to claim 4, wherein a ratio of an amount of substance of the soluble rare earth salt to the organic ligand is (30-40):(8-9).

18. The method according to claim 7, wherein a ratio of an amount of substance of the soluble rare earth salt to the organic ligand is (30-40):(8-9).

19. The method according to claim 14, wherein a ratio of an amount of substance of the soluble rare earth salt to the organic ligand is (30-40):(8-9).

20. A fluorescent metal-organic framework superstructure compound composited with functional nanomaterials, comprising a fluorescent metal-organic framework superstructure compound and a functional nanomaterial supported on a surface of the fluorescent metal-organic framework superstructure compound; wherein
- the fluorescent metal-organic framework superstructure compound is the fluorescent metal-organic framework superstructure compound according to claim 10; and wherein
- the functional nanomaterial includes or a functional organic nanomaterial, and wherein the functional organic nanomaterial includes an aggregation-induced luminescent material, an organic fluorescent dye or up-conversion nanoparticles.

* * * * *